(12) United States Patent
Chuang et al.

(10) Patent No.: US 7,554,825 B2
(45) Date of Patent: Jun. 30, 2009

(54) SWITCHING POWER SUPPLY CAPABLE OF REDUCING LOW-FREQUENCY SECONDARY-SIDE COMMON-MODE VOLTAGE

(75) Inventors: Yuan-Cheng Chuang, Hsinchu (TW); Chun-Teh Chen, Taichung County (TW); Ying-Chieh Lin, Taichung County (TW); Jenn-Jong Shieh, Hsinchu County (TW)

(73) Assignee: Jentec Technology Co., Ltd., Chung-Ho (TW)

( * ) Notice: Subject to any disclaimer, the term of this patent is extended or adjusted under 35 U.S.C. 154(b) by 254 days.

(21) Appl. No.: 11/607,977

(22) Filed: Dec. 4, 2006

(65) Prior Publication Data

US 2007/0127275 A1    Jun. 7, 2007

(30) Foreign Application Priority Data

Dec. 7, 2005    (TW) .............................. 94143094 A (51) Int. Cl.
*H02M 3/24*    (2006.01)

(52) U.S. Cl. ........................ 363/97; 363/21.12; 307/51

(58) Field of Classification Search ................... 363/44, 363/48, 50, 55, 56.1, 60, 97, 21.12; 307/43, 307/71, 235, 401; 361/82, 91.1, 111, 118, 361/119, 127, 137

See application file for complete search history.

(56) References Cited

U.S. PATENT DOCUMENTS 6,867,575 B2 *    3/2005    Jacob D'Cunha ............ 360/50

* cited by examiner

*Primary Examiner*—Rajnikant B Patel
(74) *Attorney, Agent, or Firm*—Grace Lee Huang; Bayshore Patent Group, LLC.

(57) ABSTRACT

The invention discloses a switching power supply capable of reducing a low-frequency secondary-side common-mode voltage. The power supply mainly has two common-mode filtering circuit devices to prevent an AC voltage and an AC current from coupling to a secondary side of a transformer. Thus, the electrical safety and the quality in use of the associated electronic apparatus can be enhanced, a potential difference between the electronic apparatus and the ground may be greatly reduced, and an AC hum of a speaker coupled to an output of the power supply may be reduced or even eliminated.

12 Claims, 8 Drawing Sheets

SWITCHING POWER SUPPLY CAPABLE OF REDUCING LOW-FREQUENCY SECONDARY-SIDE COMMON-MODE VOLTAGE

BACKGROUND OF THE INVENTION (1) Field of the Invention

The invention relates to a power supply, and more particularly to a switching power supply capable of preventing an AC voltage and an AC current from coupling to a secondary side of a transformer.

(2) Description of the Prior Art

An electronic device usually utilizes a battery to serve as a power source so that it can be conveniently carried. However, the time in use is limited due to the problem of the power storing capacity of the battery. The problem of the limited time always exists even if the efficiency of the battery is continuously improved and enhanced.

When the electronic device is continuously used for a very long period of time, the battery is replaced with an AC-to-DC power device (e.g., a power supply) in order to solve the problem of charging the battery. The most economic implementation of this power supply is an linear power supply having a transformer composed of silicon steel sheets. Although the linear power supply can solve the problem of the short time in continuous using of the electronic device, the size and the weight of the linear power supply are greater than those of the switching power supply, and the poor efficiency of the linear power supply cannot be accepted by the user because the working frequency of the linear power supply is very low. To meet the trends of the high efficiency, the light weight, the thin thickness, the short length and the small size, the cheaper linear power supply is ultimately replaced by the switching power supply even in the occasion of the low power application.

Figure 1:
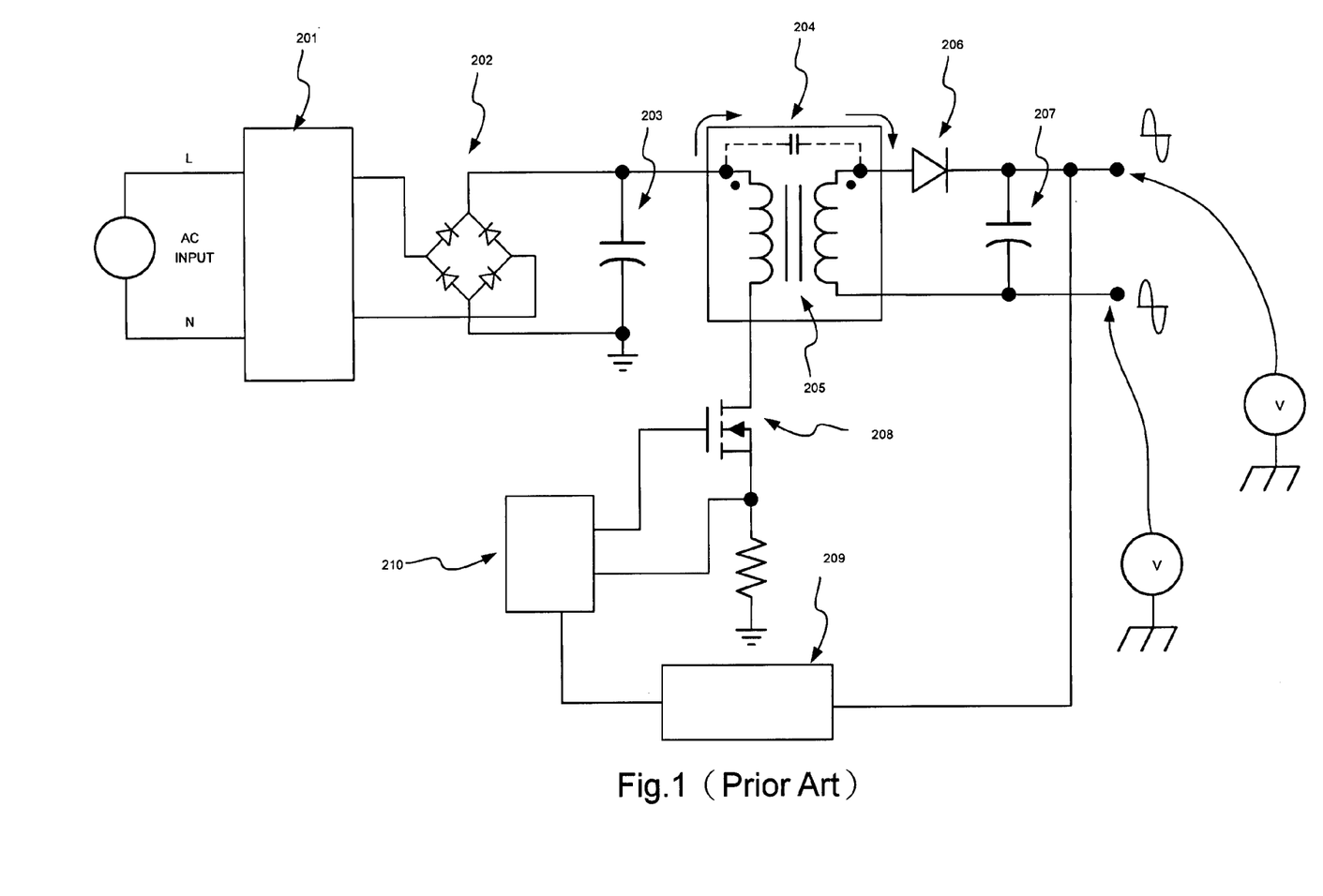
FIG. 1 shows a conventional switching power supply.

FIG. 1 shows the most frequent implementation of a switching power supply. When an input voltage is at a positive half cycle, the current flows through an input filtering device 201 and a bridge rectifier 202 to charge a filtering capacitor 203, and then flows back to the power source from a grounding terminal of the filtering capacitor 203. When a main switch 208 is switched to turn on, a transformer 205 transforms the charges stored in the filtering capacitor 203 to form an output voltage according to a voltage ratio, and an output rectifying diode 206 and a filtering capacitor 207 respectively rectify and filter the output voltage to provide a DC voltage for output. When the input voltage is at a negative half cycle, the current flows through the input filtering device 201 and the bridge rectifier 202 to charge the filtering capacitor 203, and then flows back to the power source from the filtering capacitor 203. This circuit operates stably according to the rule.

On the other hand, the size of the switching power supply is usually very small in the high-frequency trend, and the sandwich winding method is usually adopted due to the consideration of the coupling effect between the windings of the transformer, so the parasitic capacitor of the transformer is usually larger. In addition, in order to satisfy the electromagnetic compatibility and electromagnetic interference, a bridging capacitor 204 has to be added between the primary side and the secondary side of the transformer. The bridging capacitor 204 in an equivalent circuit is connected in parallel to a capacitor between the parasitic capacitance.

Figure 5:
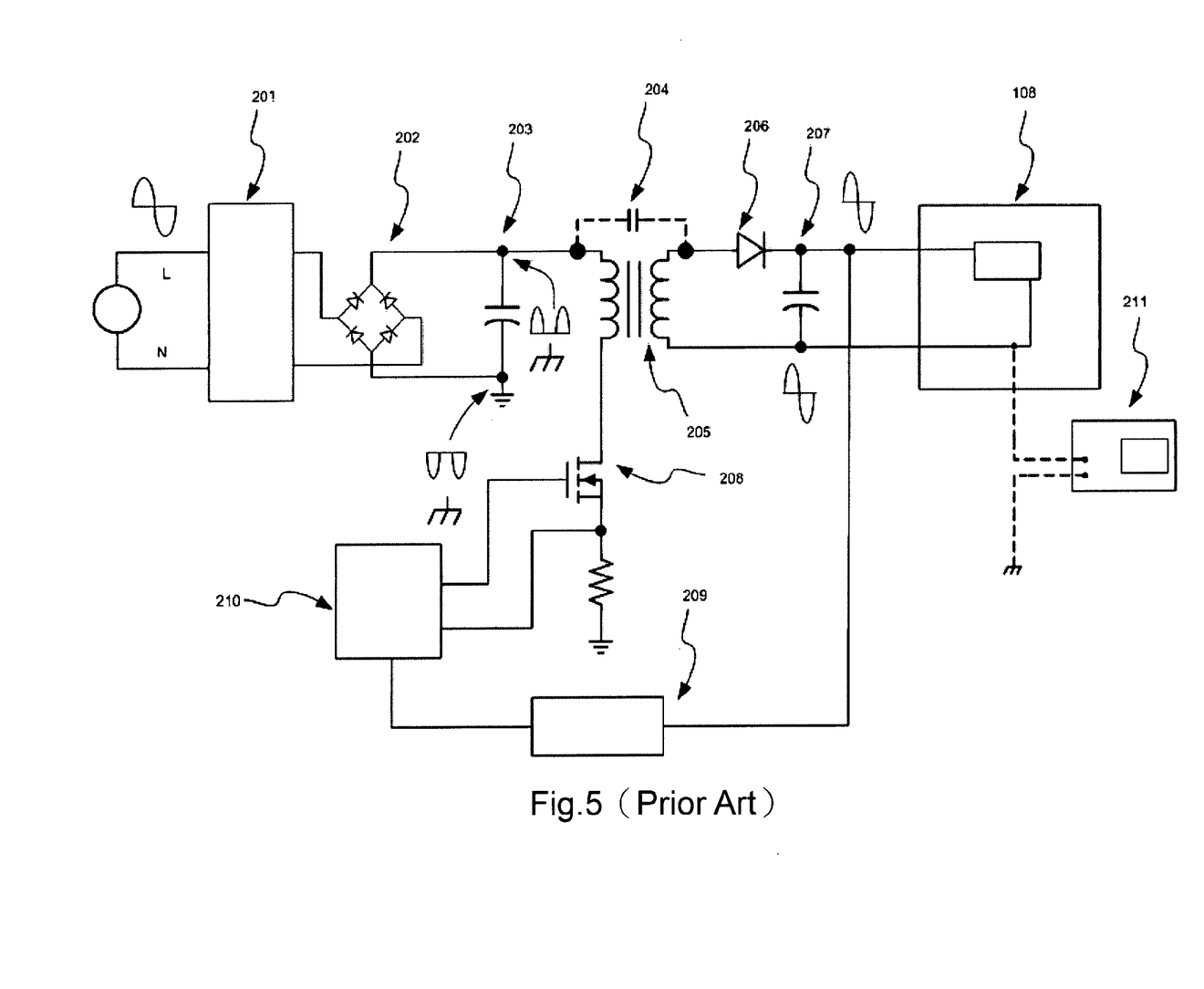
FIG. 5 is a schematic illustration showing a VoIP, which generates the AC hum.

When the input voltage is electrically connected to the filtering capacitor 203 through the input filtering device 201 and the bridge rectifier 202 by a line (L), the positive terminal of the filtering capacitor 203 has an AC voltage with a positive half cycle relative to the ground. Similarly, when the input voltage is electrically connected to the filtering capacitor 203 through the input filtering device 201 and the bridge rectifier 202 by a neutral (N), the negative terminal of the filtering capacitor 203 has an AC voltage with a negative half cycle relative to the ground. The positive half cycle and the negative half cycle are coupled to the secondary side through the bridging capacitor 204, thereby causing an AC low-frequency carrier voltage (or referred to as a common mode voltage) on the circuit of the secondary side relative to the ground. When the leakage current is being tested (the equivalent model is shown in FIG. 5), the common mode voltage of the primary side is coupled to the node of the secondary side through the bridging capacitor 204 and is then discharged to the ground through the loop formed by the testing equipment because the method and the object of the testing equipment are to simulate the behavior and the equivalent circuit of the human body. Because the common mode voltage exists at each node of the secondary side, a current (I) flows through the testing equipment to generate the leakage current. Thus, when the common mode voltage is low, the generated leakage current is low, and the danger to the human body is also low.

In addition, when this AC low-frequency carrier voltage is supplied to a load 108, which may be an analog or digital audio amplifier, a home appliance serving as an audio transfer medium (e.g., a phone or even an advanced VoIP phone), or a medical equipment, which may contact the human body, the following problems occur.

Figure 2:
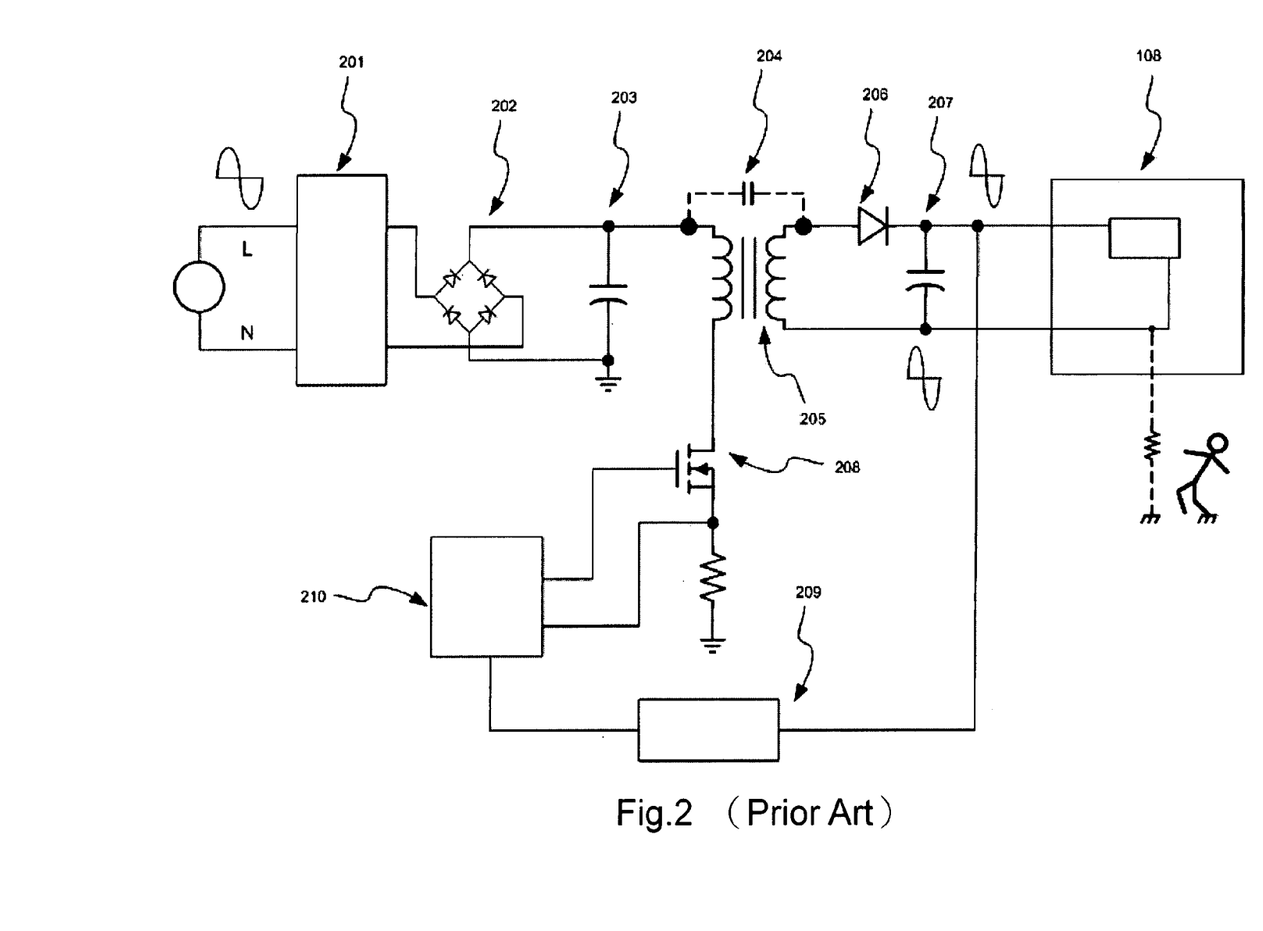
FIG. 2 is a schematic illustration showing a discharge path for a common mode voltage.

1. When the human body touches the circuit node of the secondary side, the voltage of the secondary side is coupled the ground through the human body so that a loop is formed, and the energy stored in the bridging capacitor 204 is discharged through the human body such that the human body tends to shock. This is because the human body itself is a conductive object R and the human body is at the position with the ground potential. The associated equivalent model is illustrated in FIG. 2.

Figure 3:
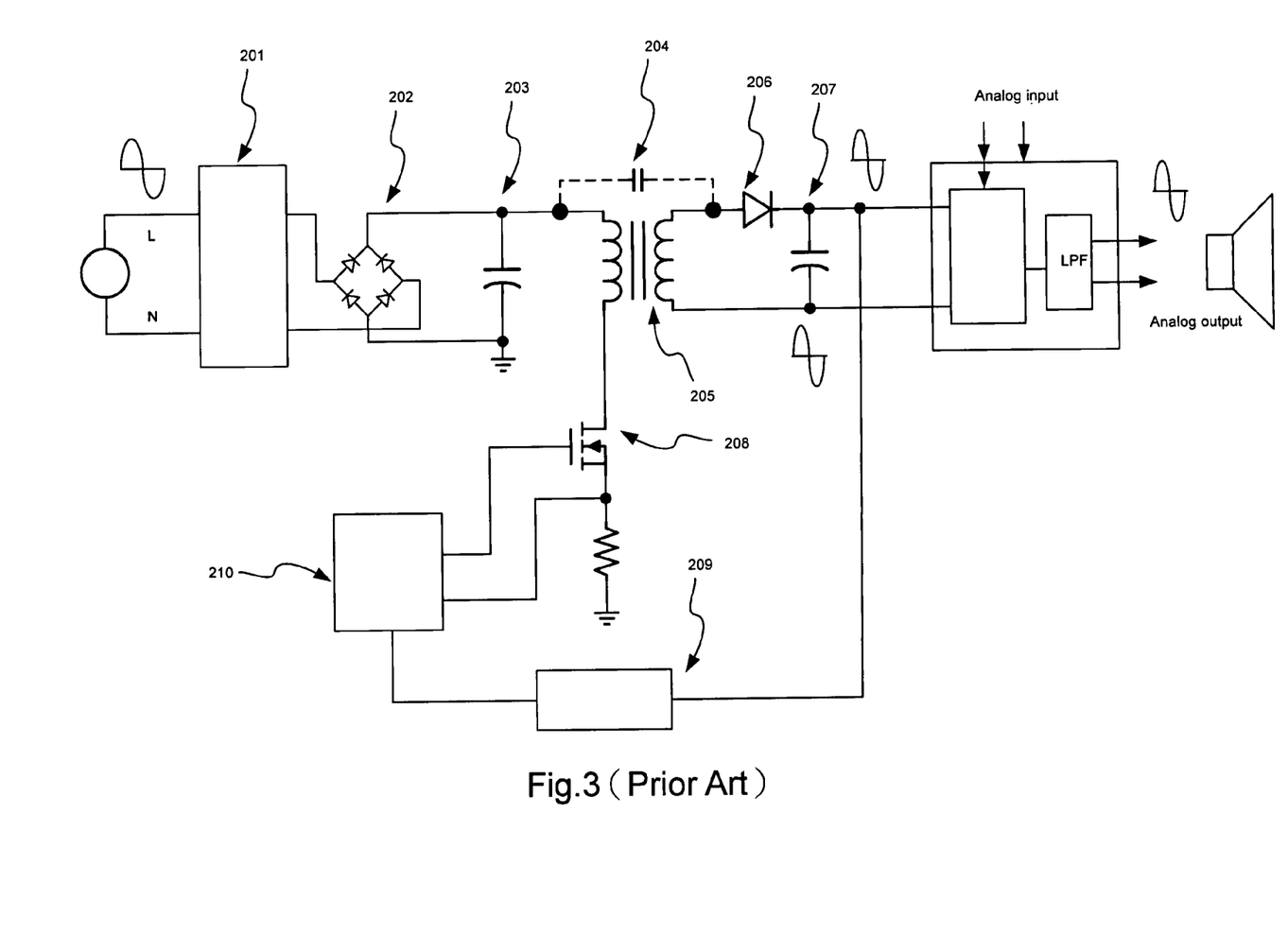
FIG. 3 is a schematic illustration showing a formation of a low-frequency AC hum.

2. When the load 108 is an audio product, the common mode voltage enters an analog or digital signal amplifier circuit through a DC output wire. Then, the low-frequency common mode voltage and the analog or digital signal are mixed and then enter the amplifier circuit for amplifying the mixed signal multiple times. Finally, a low-pass filter (LPF) outputs the amplified signal, and an audio signal with the low-frequency carrier is generated on the speaker such that a low-frequency AC hum is generated. The circuit model of generating the AC hum is shown in FIG. 3.

Figure 4:
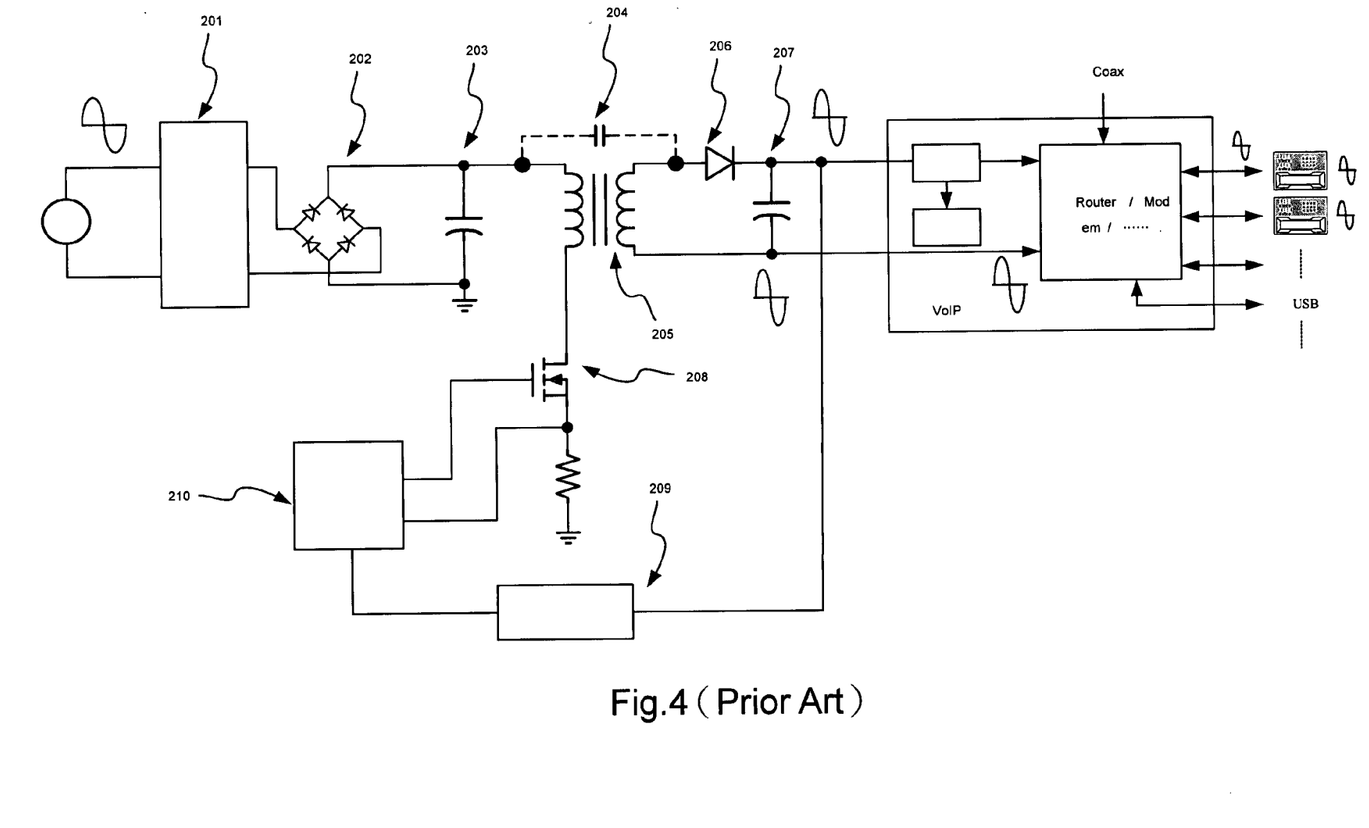
FIG. 4 is a schematic illustration showing a formation of a leakage current.

3. When the load 108 is a phone, an IP phone (VoIP), a router or a modem, the low-frequency common mode voltage is coupled to the secondary side through the bridging capacitor 204. When the load is connected, the common mode voltage enters the system with the power. When the user touches the phone apparatus, the equivalent resistance of the human body enables the common mode voltage to be grounded so that the loop may be formed. So, the microphone of the phone generates the low-frequency AC hum. The circuit model of generating the AC hum is illustrated in FIG. 4.

It is to be noted that the parasitic capacitor of the transformer is a parameter that cannot be eliminated. So, the problem of the common mode voltage coupling cannot be eliminated, and it is challenging to seek a countermeasure to reduce or suppress the AC hum.

SUMMARY OF THE INVENTION

The invention provides a switching power supply with a reduced low-frequency secondary-side common-mode voltage. The power supply prevents an AC voltage and an AC current from coupling to a secondary side of a transformer so as to enhance the electrical safety and the quality in use of the associated electronic apparatus, to greatly reduce the contact leakage current of the electronic apparatus, to reduce or even eliminate an AC hum of a speaker, and to reduce the potential difference relative to the ground greatly.

Further aspects, objects, and desirable features of the invention will be better understood from the detailed description and drawings that follow in which various embodiments of the disclosed invention are illustrated by way of examples.

DETAILED DESCRIPTION OF THE PREFERRED EMBODIMENTS

Figure 6:
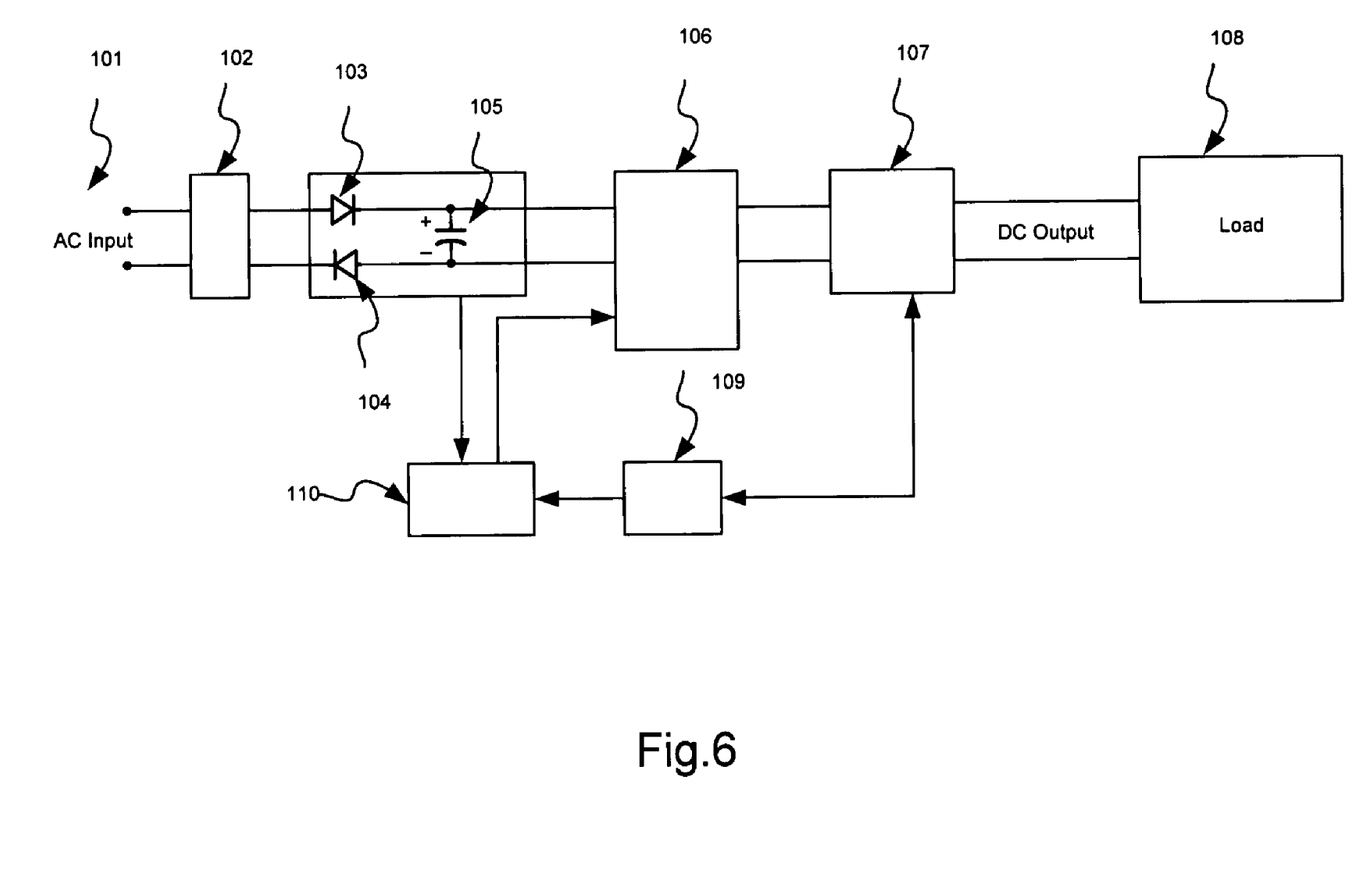
FIG. 6 shows an embodiment of the invention.
Figure 7:
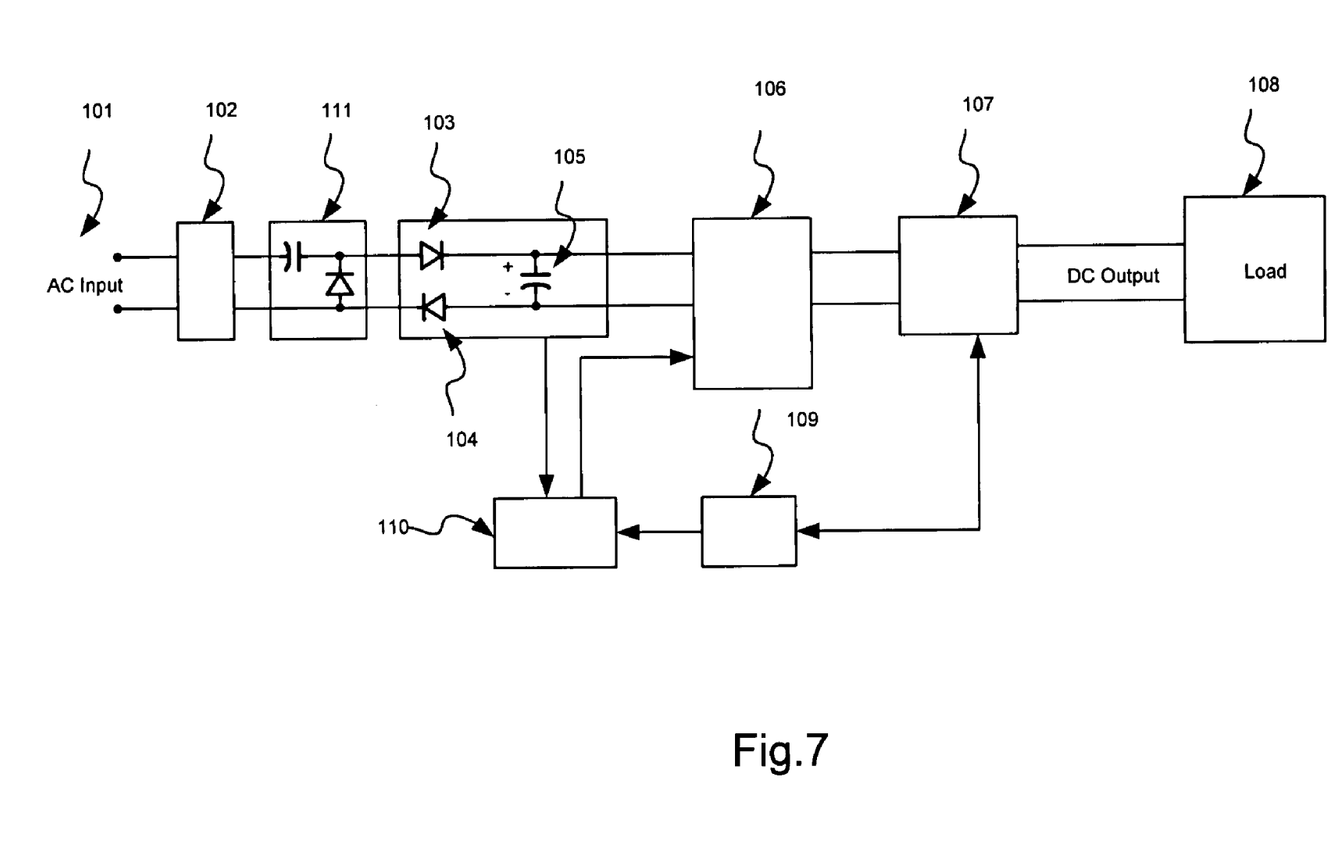
FIG. 7 shows an embodiment in conjunction with a power voltage multiplier of the invention.
Figure 8A:
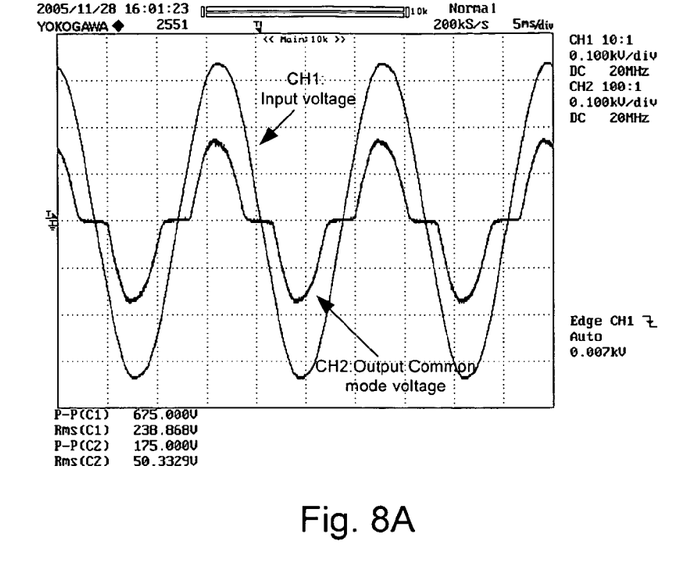
FIGS. 8A and 8B show waveforms of the switching power supplies according to the invention and the prior art of FIG. 1.
Figure 8B:
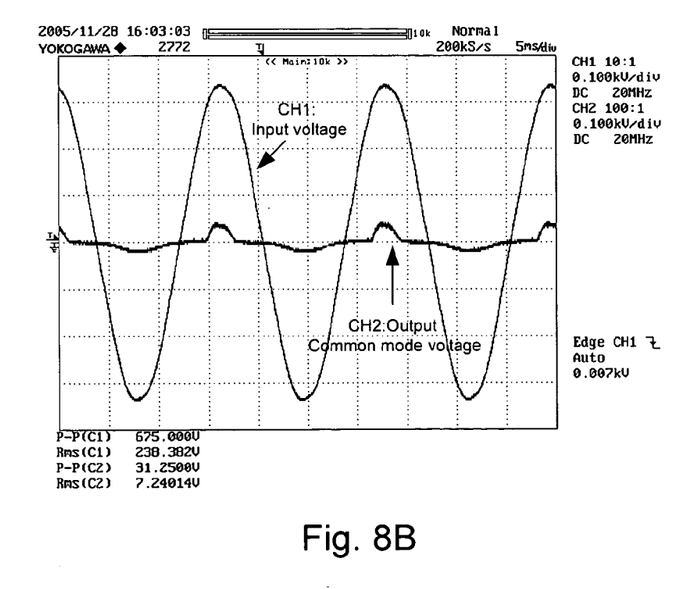

FIG. 6 is block diagram showing a switching power supply capable of reducing a low-frequency secondary-side common-mode voltage according to an embodiment of the invention. Referring to the FIG. 6, the power supply 1 includes an input filtering device 102, a first common-mode filtering circuit device 103, a second common-mode filtering circuit device 104, a filtering capacitor 105, a transformer & switch device 106, an output filter & voltage regulator 107, a photo coupler 109 and a PWM and control circuit 110. When the input voltage is at the positive half cycle, the current flows through the first common-mode filtering circuit device 103 to charge the filtering capacitor 105 and then flows back to a power source from the second common-mode filtering circuit device 104. At this moment, the low-frequency common mode voltage with the positive half cycle still exists. When the input voltage is at the negative half cycle, the input voltage is blocked using the second common-mode filtering circuit device 104. So, no current path passes through the filtering capacitor 105. Thus, only the positive half cycle of the common mode voltage is obtained at the positive terminal of the filtering capacitor 105, and the voltage with the negative half cycle originally existing between the negative terminal of the filtering capacitor 105 and the ground has disappeared. Because only the positive component is left in the voltage of the filtering capacitor 105 relative to the ground, and the transformer contained in the transformer & switch device 106 inherently has the isolation function, the DC component on the filtering capacitor 105 cannot be electrically coupled to the output terminal through the transformer, and the effective common mode voltage at the node of the output terminal can be greatly reduced. FIG. 7 shows the power supply of the invention, in which an additional power voltage multiplier device 111 is connected between the input filtering device 102 and the first common-mode filtering circuit device 103, and the signal passing through the power voltage multiplier is electrically coupled to the common-mode filtering circuit devices. FIGS. 8A and 8B show waveforms of the switching power supplies according to the invention and the prior art of FIG. 1. When the effective AC input voltage is 220 volts, the actually measured waveform of the common mode voltage at the node of the output terminal of the prior art switching power supply is shown in FIG. 8A, while the actually measured waveform of the common mode voltage at the node of the output terminal of the switching power supply of the invention is shown in FIG. 8B. As shown in FIGS. 8A and 8B, it is obtained that the peak value of the common mode voltage of the apparatus of the invention is about 35 volts, which is attenuated to about ⅕ that (about 175 volts) of the typical switching power supply of FIG. 1.

In summary, the invention has the following functions.

1. The low-frequency common mode voltage cannot be smoothly coupled to the secondary side, so the low-frequency AC hum can be isolated.

2. Even if the actual circuit has a small low-frequency common mode voltage coupled to the secondary side, the common mode voltage for generating the leakage current has been greatly reduced. Thus, the leakage current cannot be increased even if the parasitic capacitor is increased.

3. When the load 108 is a phone or an IP phone, the common mode voltage, which originally passes through the DC terminal, has been greatly reduced. Because of the common-mode filtering circuit device, the low-frequency AC hum originally existing on the microphone of the phone is eliminated.

Although the invention has been described with reference to specific terms, this description is not meant to be construed in a limiting sense. Various modifications of the disclosed embodiments and terms, as well as alternative embodiments and terms, will be apparent to persons skilled in the art. It is therefore contemplated that the appended claims will cover all modifications that fall within the true scope of the invention.

New characteristics and advantages of the invention covered by this document have been set forth in the foregoing description. It is to be expressly understood, however, that the drawings are for the purpose of illustration only and are not intended as a definition of the limits of the invention. Changes in methods, shapes, structures or devices may be made in details without exceeding the scope of the invention by those who are skilled in the art. The scope of the invention is, of course, defined in the language in which the appended claims are expressed.

What is claimed is:

1. A switching power supply capable of reducing a low-frequency AC hum, the power supply comprising:
    an input AC power;
    an input filtering device;
    a first common-mode filtering circuit device;
    a second common-mode filtering circuit device;
    a filtering capacitor;
    a transformer & switch device having a transformer and a switch connected in series;
    an output filtering & voltage regulator;
    a pulse width modulation device; and
    a load, wherein:
    the input AC power is electrically connected to input terminals of the input filtering device;
    output terminals of the input filtering device are connected, in parallel, to a serial loop, which is composed of the first common-mode filtering circuit device, the second common-mode filtering circuit device and the filtering capacitor connected in series;

input terminals of the filtering capacitor and the transformer & switch device are connected in parallel;

output terminals of the transformer & switch device are connected to the output filtering & voltage regulator in parallel; and the load is connected to the output filtering & voltage regulator in parallel.

2. The power supply according to claim 1, wherein each of the first common-mode filtering circuit device and the second common-mode filtering circuit device is a semiconductor element which turns on in a unidirectional manner.

3. The power supply according to claim 1, further comprising a power voltage multiplying device.

4. The power supply according to claim 2, further comprising a power voltage multiplying device.

5. The power supply according to claim 1, wherein the load is an analog signal amplifying device, a digital signal amplifying device, a medical equipment apparatus, a router, an IP phone (VoIP) or a modem.

6. The power supply according to claim 2, wherein the load is an analog signal amplifying device, a digital signal amplifying device, a medical equipment apparatus, a router, a IP phone (VoIP) or a modem.

7. The power supply according to claim 1, wherein each of the first common-mode filtering circuit device and the second common-mode filtering circuit device is a diode.

8. The power supply according to claim 2, wherein each of the first common-mode filtering circuit device and the second common-mode filtering circuit device is a diode.

9. The power supply according to claim 1, further comprising an output voltage regulator and a photo-coupler feedback device.

10. The power supply according to claim 2, further comprising an output voltage regulator and a photo-coupler feedback device.

11. The power supply according to claim 1, further comprising a PWM and control circuit.

12. The power supply according to claim 2, further comprising a PWM and control circuit.

* * * * *